United States Patent [19]

Profera

[11] 4,163,974

[45] Aug. 7, 1979

[54] ANTENNA FEED SYSTEM

[75] Inventor: Charles E. Profera, Cherry Hill, N.J.

[73] Assignee: RCA Corporation, New York, N.Y.

[21] Appl. No.: 842,079

[22] Filed: Oct. 14, 1977

[51] Int. Cl.$^2$ ............................ G01S 9/02; H04B 7/06; H01Q 3/24

[52] U.S. Cl. ............................ 343/16 M; 343/16 R; 343/100 SA; 343/854

[58] Field of Search ................... 343/5 R, 16 R, 16 M, 343/100 SA, 854, 876, 12 SB

[56] References Cited

U.S. PATENT DOCUMENTS

| | | | |
|---|---|---|---|
| 3,474,447 | 10/1969 | Melancon | 343/100 SA |
| 3,731,315 | 5/1973 | Sheleg | 343/854 |
| 3,757,326 | 9/1973 | White | 343/16 M |
| 3,964,066 | 6/1976 | Nemit | 343/100 SA |
| 4,041,501 | 8/1977 | Frazita et al. | 343/100 SA |
| 4,063,243 | 12/1977 | Anderson et al. | 343/100 SA |

OTHER PUBLICATIONS

"A Matrix-Fed Circular Array for Continuous Scanning" by Boris Sheleg, *Proceedings of the IEEE*, vol. 56, Nov. 1968, pp. 2016–2027.

*Primary Examiner*—Maynard R. Wilbur
*Assistant Examiner*—Lawrence Goodwin
*Attorney, Agent, or Firm*—H. Christoffersen; Joseph D. Lazar; Robert A. Hays

[57] ABSTRACT

Eight radiators, disposed along a line, are coupled to a radar via a Butler matrix. In response to a transmitted signal from the radar, inverse transform signals that have amplitudes representative of values of a sinusoid in an angular range of zero radians to $\pi$ radians is applied to the Butler matrix. The inverse transform signals cause excitation to be applied to two of the radiators that are adjacent to each other. The inverse transform of the sinusoid at the output of the Butler matrix, in addition to allowing the excitation of two adjacent pairs of radiators, also provides a transmitted beam having reduced beamwidth and lower sidelobes. The two adjacent radiators are selected by selecting a phase pattern of the inverse transform signals.

7 Claims, 16 Drawing Figures

ANTENNA FEED SYSTEM

The Government has rights in this invention pursuant to Contract No. F30602-76-C-0290 awarded by the Department of the Air Force.

CROSS REFERENCE TO RELATED APPLICATIONS

Of interest is the following copending application: Ser. No. 842,080 filed on Oct. 18, 1977, entitled, "Paraboloid Reflector Antenna," based on the invention of Leonard H. Yorinks and Robert M. Scudder.

BACKGROUND OF THE INVENTION

1. Field of Invention

This invention relates to radar and more particularly to a radar that provides a beam which continuously scans a partial region.

2. Description of the Prior Art

In a military operation on land, it is usually desirable to have a radar that is mobile, light, small and thereby suitable for deployment near a battlefield. As known to those skilled in the art, most of the weight and bulk of the radar is in the antenna of the radar. A fixedly mounted antenna, such as a phased array antenna, is not suitable for deployment near the battlefield because radiating elements of the phased array antenna are heavy and bulky.

One type of radar, designed for use in the military operation on land, has a paraboloid reflector antenna that typically includes a plurality of radiators disposed in an elevation sector near the focal point of a paraboloid reflector. The radiators and the reflector are mounted on a platform that is rotatable about an azimuth axis. When excitation is applied to a radiator, energy therefrom is transmitted to the reflector. The energy is reflected from the reflector, thereby providing a single beam of energy that propagates through a spatial region. The angle of elevation of the beam is related to the position of the excited radiator. The azimuth of the beam is selected by rotating the platform about the azimuth axis.

A sequential application of excitation to the radiators causes the radiators to provide a scan beam that continuously scans the spatial region in elevation. The scan beam continuously scans the spatial region in azimuth and elevation when the platform is rotated about the azimuth axis during the sequential application of excitation.

Usually, the apparatus for sequentially exciting the radiators is costly and complex. Moreover, the scan beam may have an undesired lack of uniformity during the sequential application of excitation. Additionally, the sequential application of excitation may cause an undesired spurious excitation of some of the radiators. The spurious excitation causes large, unwanted side lobes in a far field pattern of the paraboloid reflector antenna along with a wider beamwidth.

SUMMARY OF THE INVENTION

According to the present invention, a Butler matrix provides excitation to an antenna system with three or more radiators in response to signals that have amplitudes representative of values of a sinusoid within an angular range of zero radians to $\pi$ radians. The excitation is provided to a first pair of radiators and to a second pair of the radiators when the signals have phase shifts representative of said first and second pairs of radiators, respectively. The inverse transform of the sinusoid is effective to reduce unwanted high sidelobes and beamwidth spreading.

DESCRIPTION OF THE PREFERRED EMBODIMENT

Figure 1:
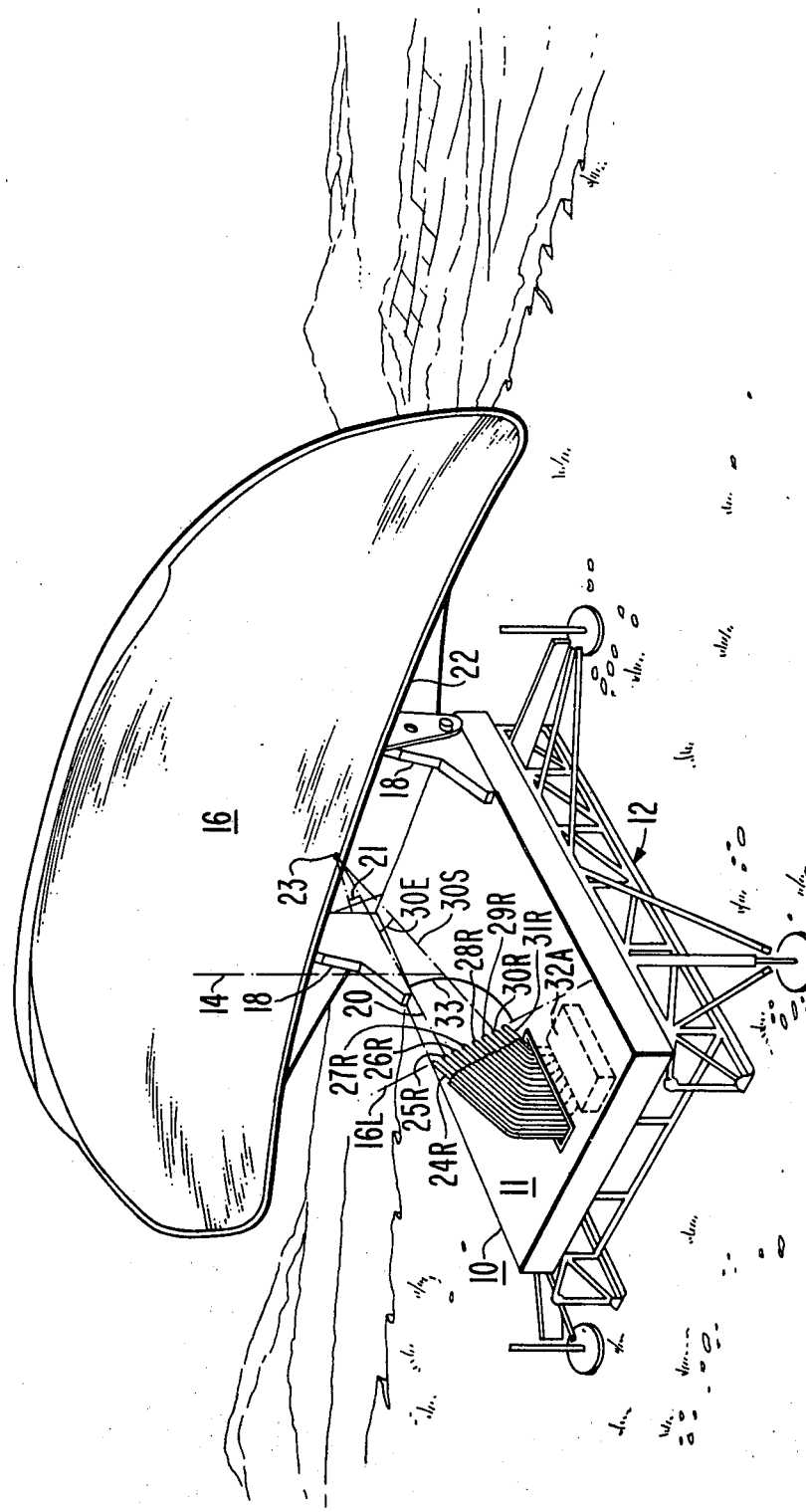
FIG. 1 is a perspective view of an antenna system in accordance with the preferred embodiment of the present invention.

As shown in FIG. 1, an antenna system is comprised of a platform 10 that is mounted upon a supporting structure 12 which rests upon the ground. Platform 10 has a surface 11 that is substantially parallel to the ground. Moreover, platform 10 is rotatable about an azimuth axis 14 which is substantially perpendicular to surface 11.

A generally elliptical paraboloid reflector 16 is fixedly connected by mounting brackets 18 to surface 11. Alternatively, reflector 16 may be connected to platform 10 in any other suitable manner.

Reflector 16 has an axis of revolution 20 that is displaced in elevation from surface 11 by an angle 21 which is approximately two degrees. Axis 20 intersects a lower edge 22 of reflector 16 at an intersection point 23. In an alternative embodiment, axis 20 does not intersect reflector 16.

Platform 10 carries radiators 24R–31R that are fixedly disposed substantially within an elevation plane along a line 16L that passes through the focal point of reflector 16. Therefore the distance from line 16L to point 23 is the focal length of reflector 16. Line 16L forms an angle 33 with axis 20 in accordance with a relationship which is given as:

$$\phi = \arctan 4f/(y_1 + y_2) \tag{1}$$

where $\phi$ is angle 33;

f is the focal length of reflector 16;

y$_1$ is a distance of axis 20 from a top edge of reflector 16; and y$_2$ is a distance of axis 20 from edge 22.

Typically, angle 33 equals sixty six degrees.

When excitation is applied to any one of radiators 24R–31R, electromagnetic energy is transmitted therefrom to reflector 16. In response to the transmitted energy, a scan beam is reflected from reflector 16 whereby the transmitted energy is directed from the antenna system and propagated through a spatial region. Because radiators 24R–31R are disposed along line 16L, the scan beam is focused in azimuth. Furthermore, since platform 10 is rotatable about axis 14, the azimuth of the scan beam may be selected by rotating platform 10. As explained hereinafter, the scan beam has a desired angle of elevation by applying excitation to a selected two of radiators 24R–31R.

Radiators 24R–31R are connected to a control unit 32A that applies excitation to radiators 24R–31R. Additionally, control unit 32A provides a target signal when a target reflects energy to the antenna system. Control unit 32A is described hereinafter in conjunction with a description of FIG. 2.

A line of sight 30S from radiator 30R to point 23, for example, subtends a radiator angle 30E with axis 20; angle 30E is below axis 20. Because of angle 30E, when the energy is transmitted by radiator 30R, the scan beam subtends an angle of elevation with axis 20 that is directly related to angle 30E. However, the angle of elevation of the scan beam is above axis 20.

Since radiators 24R–31R are disposed in the elevation plane, radiators 24R–31R subtends respective radiator angles that differ from each other. Accordingly, the scan beam has the desired angle of elevation when excitation is applied to a selected one of radiators 24R–31R.

It should be understood that there is a defocusing in elevation of the scan beam directly related to the angle of elevation of the scan beam. The defocusing is characterized by the scan beam being divergent in elevation. As known to those skilled in the art, when the scan beam diverges it is suitable for detecting a target within a large spatial region at a short range.

It should be appreciated that when there is a large angle of elevation of the target subtended from axis 20 by a line of sight from point 23 to the target, the target is usually at short range. Since the defocusing is directly related to the elevation angle of the scan beam, the target can be detected within a large region.

Figure 2:
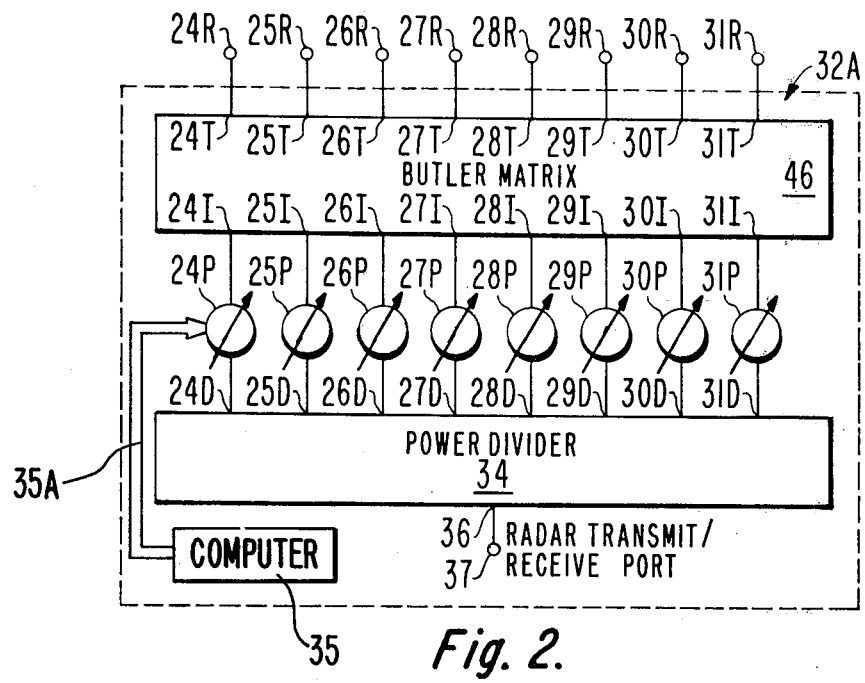
FIG. 2 is a schematic block diagram of apparatus for providing excitation to radiators in the embodiment of FIG. 1.

As shown in FIG. 2, to control the application of the excitation to radiators 24R–31R, control unit 32A includes a suitable power divider 34 that is connected to a radar (not shown) at a transmit/receive port 36 thereof. In response to a transmitted signal of the radar, a group of eight divider signals are provided by power divider 34 at divider ports 24D–31D thereof. Power divider 34 may be selected from any suitable type well known in the microwave art.

Figure 3:
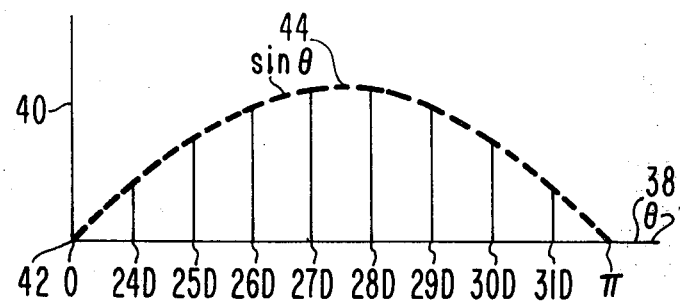
FIG. 3 is a graph of amplitudes of a group of inverse transform signals applied to a Butler matrix of FIG. 2.

As shown in FIG. 3, ports 24D–31D are represented as evenly spaced points along an abscissa 38 where the eight divider signals have amplitudes representative of values of a sinusoid within an angular range of zero radians to $\pi$ radians. Moreover, because of the symmetry of a sinusoid, the amplitudes of the divider signals at ports 24D and 31D equal each other. Similarly, the amplitudes of the divider signals equal each other at ports 25D and 30D, ports 26D and 29D and ports 27D and 28D.

It should be understood that power divider 34 is a linear, bilateral network. Therefore, when a group of signals is provided to ports 24D–31D, a corresponding signal is provided to transmit/receive port 36.

Ports 24D–31D are coupled to a Butler matrix 46 (FIG. 2) at inverse transform ports 24I–31I thereof through phase shifters 24P–31P, respectively. Additionally, Butler matrix 46 has transform ports 24T–31T that are connected to radiators 24R–31R, respectively.

In response to a signal representation of an inverse discrete Fourier transform being applied to ports 24I–31I, a signal representation of the discrete Fourier transform is provided at ports 24T–31T. Conversely, in response to the signal representation of the discrete Fourier transform being applied to ports 24T–31T, the signal representation of the inverse discrete Fourier transform is provided at ports 24I–31I. More particularly, signals at ports 24I–31I and ports 24T–31T are in accordance with a transform relationship which is given as:

$$b_n = \frac{1}{8} \sum_{m=24}^{31} a_m e^{j\phi(m,n)} \tag{2}$$

wherein n is the reference number of an inverse transform port;

m is the reference number of a transform port;

$b_n$ is the amplitude of a signal at the inverse transform port having the reference number, n;

$a_m$ is the amplitude of a signal at the transform port having the reference number, m;

$$\phi(m,n) = \delta_m (n - 23 - \frac{9}{2}); \text{ and}$$

$$\delta_m = \frac{\pi}{4} (\frac{9}{2} - m - 23)$$

As explained hereinafter, it is desired that the signals at ports 24I–31I (referred to as inverse transform signals) be respectively equal in amplitude to the group of divider signals at ports 24D–31D. When the inverse transform signals are equal in amplitude to the divider signals, excitation is simultaneously applied to two adjacent ones of radiators 24R–31R. Moreover, the two adjacent ones of radiators 24R–31R are selected for excitation by a selection of phases of the inverse transform signals.

Phase shifters 24P–31P, referred to hereinbefore, are connected by a bus 35a to a computer 35 that provides a signal representation of a selected two adjacent ones of radiators 24R–31R. Phase shifters 24P–31P are of a type that provides a signal that has an amplitude substantially equal to the amplitude of an input signal applied thereto. Moreover, the signals provided by phase shifters 24P–31P and input signals applied thereto have respective phase differences in accordance with the signal representation. In response to the divider signals and the signal representation, phase shifters 24P–31P provide the inverse transform signals to Butler matrix 46.

It should be understood that phase shifters 24P–31P are reciprocal networks. Accordingly, when Butler matrix 46 applies signals to phase shifters 24P–31P, signals are provided to ports 24D–31D that are equal in amplitude to signals at ports 24I–31I, respectively.

However, the signals at ports 24D-31D and ports 24I-31I always have respective phase differences therebetween in accordance with the signal representation.

According to the present invention, when the signals provided at ports 24I-31I have amplitudes substantially equal to the amplitudes of the transmitted divider signals at ports 24D-31D, respectively, excitation is applied to radiators 24R-31R in accordance with a first transform relationship which is given as:

$$a_m = (\frac{\pi}{2})^2 \frac{\cos\phi\ (m,n)}{(\frac{\pi}{2})^2 - (\phi\ (m,n))^2} \quad (3)$$

Figure 4:
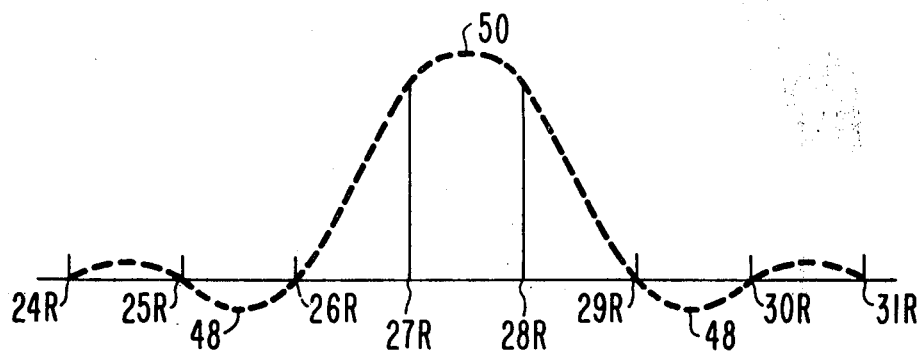
FIG. 4 is a graph of the amplitude of excitation provided to radiators of FIG. 1 when the inverse transform signals are cophased.

As shown in FIG. 4, when the signals at ports 24D-31D are cophased, according to the first transform relationship (3) excitation is applied to radiators 27R and 28R; no excitation is applied to radiators 24R, 25R, 26R, 29R, 30R and 31R because they correspond to nulls of the first transform relationship (3).

Figure 5A:
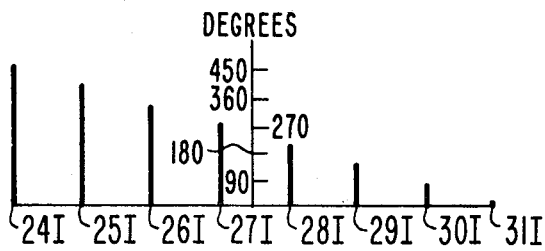
FIGS. 5A–5F are graphs of the phases of the inverse transform signals that are applied to the Butler matrix of FIG. 2.
Figure 5D:
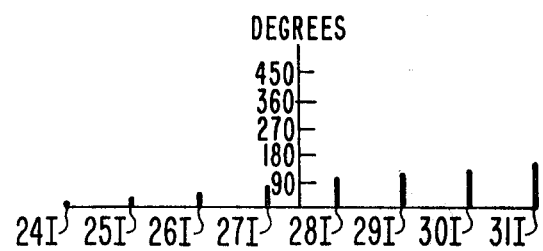

In a similar manner, when phase shifters 24P-31P provide phase shifts in accordance with FIG. 5A, excitation according to the first transform relationship (3) is applied to radiators 24R and 25R; phase shifts that cause excitation to be applied to other pairs of radiators 24R-31R are shown in FIGS. 5B-5F. Thus, as seen in FIGS. 5A-5F, the magnitudes of the various phase shifts 24I-31I introduced by the respective phase shifters 24P-31P vary according to a linear phase slope relationship. A tabulation that relates the phase shifts as shown in FIGS. 5A-5F to the application of excitation of radiators 24R-31R (according to the first transform relationship (3)) is provided in Table I, which is given hereinafter.

TABLE I

| PHASE SHIFT | REFERENCE NUMBER OF RADIATOR WHERE EXCITATION IS APPLIED |
|---|---|
| 5A | 24R, 25R |
| 5B | 25R, 26R |
| 5C | 26R, 27R |
| COPHASED | 27R, 28R |
| 5D | 28R, 29R |
| 5E | 29R, 30R |
| 5F | 30R, 31R |

It should be understood that in accordance with the invention the scan beam provides a continuous scan in elevation of a spatial region when the phase shifts are sequentially changed in the order set forth in Table I. The spatial region corresponds to the elevation sector where radiators 24R-31R are disposed.

Figure 5B:
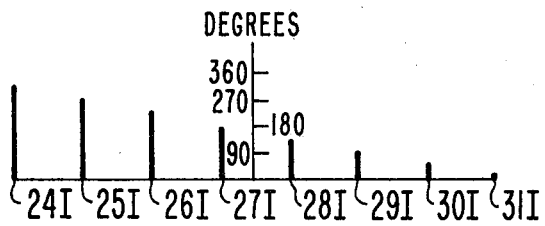
Figure 5E:
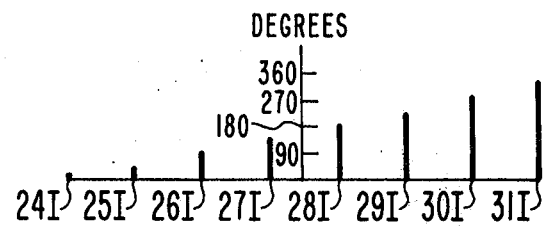
Figure 5C:
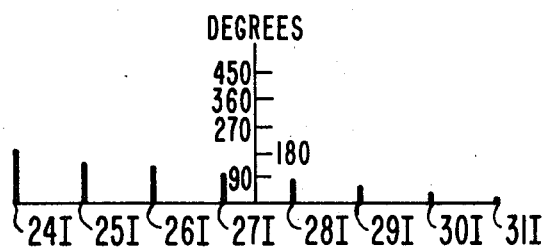
Figure 5F:
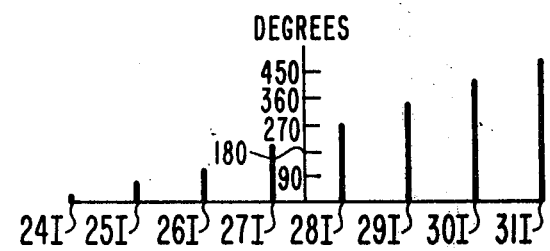

It is not normally possible to provide a discrete change from the phase pattern of FIG. 5A to the phase pattern of FIG. 5B, for example. When the discrete change is not provided, there is a high level of spurious excitation applied to the non-selected radiators resulting in a beam pattern having a wide beamwidth and a high sidelobe level.

The spurious excitation is understood by noting that peak points 48 (FIG. 4) are representative of an amplitude that is 23 db lower than an amplitude represented by peak point 50. Accordingly, when the discrete change is not provided, a spurious excitation of one of the radiators 24R-31R is at least 23 db lower than the peak excitation applied to radiators 24R-31R. Because the spurious excitation is 23 db lower than the peak excitation, the spurious excitation is tolerable.

Thus, the invention allows the use of a phase pattern between that shown in FIG. 5A and that shown in FIG. 5B, for example, without having the beam degraded with respect to beamwidth and sidelobe level. Thus, as just described, peak point 48 is representative of an amplitude that is at least 23 db lower than an amplitude represented by peak point 50 and that such a transform distribution imposed upon the radiators 24R-31R will be effective to produce the aforesaid improved beam shape characteristics.

Figure 6:
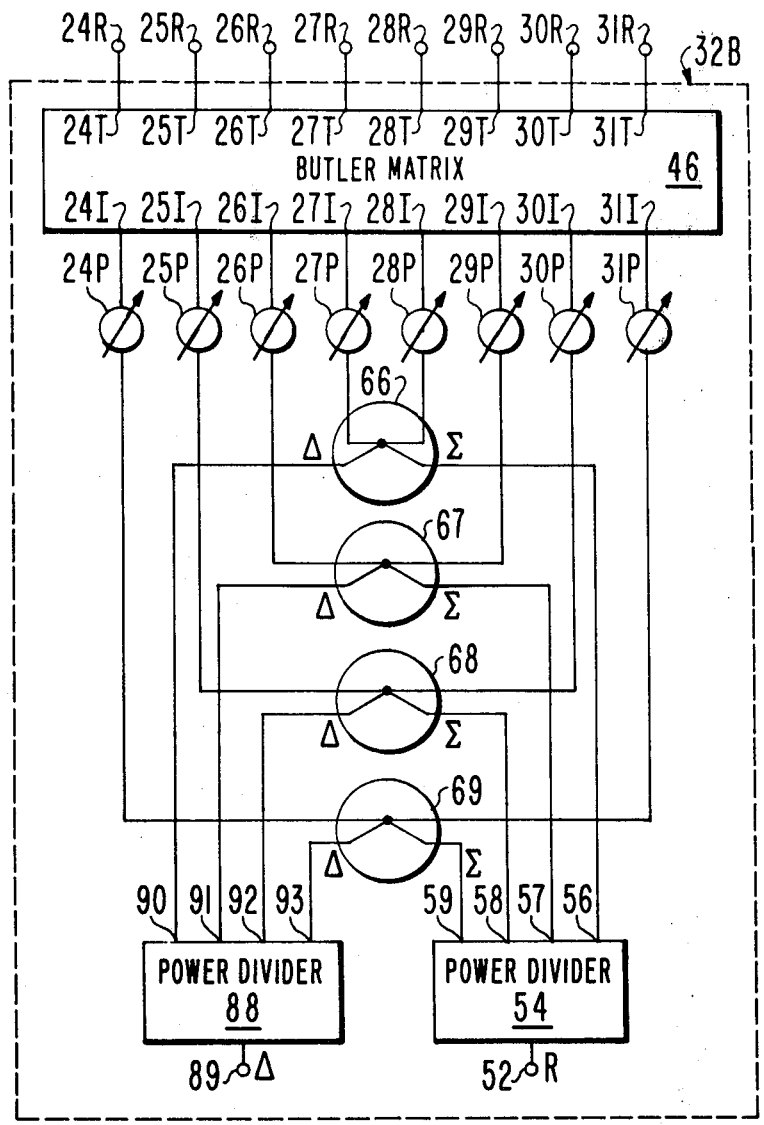
FIG. 6 is a schematic block diagram of apparatus that is used to provide a monopulse operation of the antenna system of FIG. 1.

As shown in FIG. 6, in another form of the preferred embodiment, a reference channel of a monopulse radar (not shown) is connected to a control unit 32B at a reference port 52 thereof. Within control unit 32B, port 52 is connected to a power divider 54. In response to a transmitted signal from the monopulse radar, a group of reference channel signals are provided by power divider 54 at ports 56-59 thereof. Similar to power divider 34, (FIG. 2) power divider 54 is a linear, bilateral network, whereby signals provided to ports 56-59 cause a corresponding signal to be provided at port 52.

Figure 7:
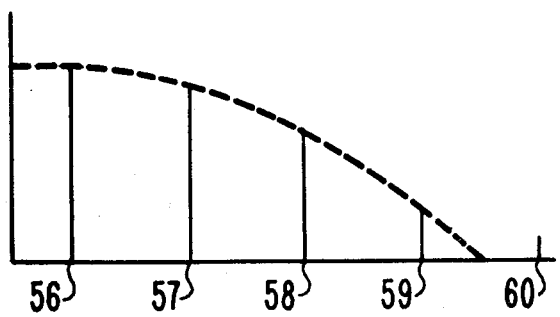
FIG. 7 is a graph of a transfer characteristic of a first power divider in the apparatus of FIG. 6.

As shown in FIG. 7, ports 56-59 are represented as evenly spaced points along an abscissa 60 where the reference channel signals have amplitudes representative of values of a sinusoid within an angular range of $\pi/2$ radians to $\pi$ radians.

Ports 56-59 are coupled to phase shifters 24P-31P through magic TEE networks 66-69, respectively. As known to those skilled in the art, signals at sum and difference ports of a magic TEE are respectively proportional to the sum and the difference of signals at a pair of signal ports of the magic TEE.

When, for example, a signal is provided to the sum port of the magic TEE, cophased signals of equal amplitude are provided at the signal ports thereof. Correspondingly, when cophased signals of equal amplitude are provided to the signals ports, a signal is provided at the sum port; no signal is provided at the difference port.

The sum ports of magic TEEs 66-69 are connected to ports 56-59, respectively. The signal ports of magic TEEs 66-69 are respectively connected to phase shifters 27P and 28P, phase shifters 26P and 29P, phase shifters 25P and 30P, and phase shifters 24P and 31P. Because of the symmetry of a sinusoid, in response to the reference channel signals, magic TEEs 66-69 provide signals to phase shifters 24P-31P that have amplitudes substantially equal to the amplitudes of the divider signals described hereinbefore in connection with FIGS. 2 and 3. Accordingly, phase shifters 24P-31P and magic TEEs 66-69 are operable to provide inverse transform signals to Butler matrix 46 similar to those described in connection with FIGS. 2 and 3.

Figure 8:
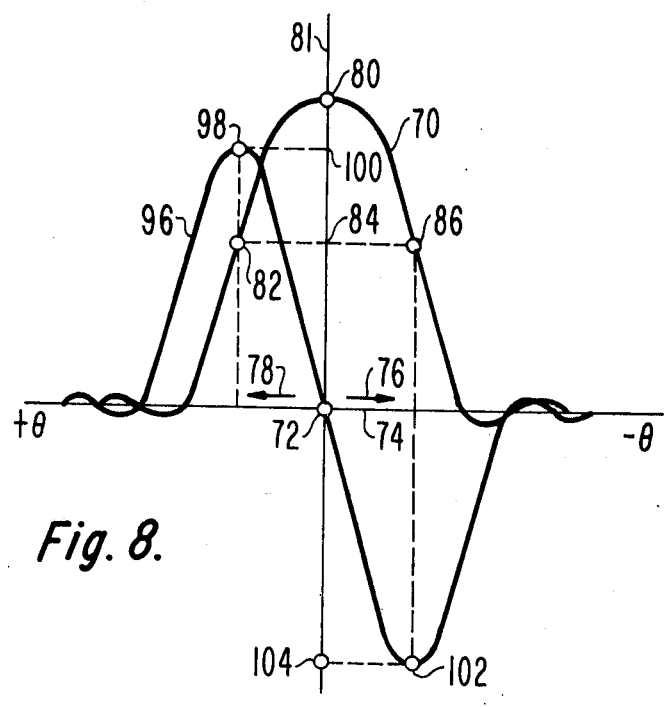
FIG. 8 is a graph of far field patterns that are produced by the apparatus of FIG. 6.

As shown in FIG. 8, when, for example, the energy is simultaneously transmitted from radiators 27R and 28R, an electric field that radiates from the antenna system has a far field represented by a reference pattern 70. Pattern 70 is in a coordinate system where a displacement from an origin 72 along an abscissa 74 is representative of an error angle. The error angle is subtended at point 23 (FIG. 1) from a line of sight that extends midways between the central axes of exemplary scan beams that are reflected from reflector 16 in response to the energy being transmitted by radiators 27R and 28R. Spatial locations along the line midway between the central axes are equally irradiated by each of the exemplary scan beams.

A peak point 80 of pattern 70 on ordinate 81 of the coordinate system has an abscissa equal to zero. Peak point 80 is representative of the strength of the electric field at locations midway between the central axes of the exemplary scan beams. Since phase shifters 24P-31P are reciprocal networks and Butler matrix 46, power divider 54, and magic TEEs 66-69 are linear bilateral networks, when the target reflects equal amounts of energy to radiators 27R and 28R, a reference channel return signal corresponding to peak point 80 is provided at terminal 52. It should be understood that all energy reflected from the target to radiators 24R-31R is via a reflection from reflector 16 (FIG. 1).

Correspondingly, a point 82 on pattern 70 has an abscissa representative of a positive error angle. Point 82 is representative of the strength of the electric field at locations where substantially all of the energy directed from the antenna system is provided by radiator 27R. Accordingly, when the target reflects energy to radiator 27R (and reflects substantially no energy to radiator 28R), a target signal having an amplitude corresponding to a point 84 on ordinate 81 is provided at terminal 52. It should be understood that points on pattern 70 that have an abscissa between the abscissa of point 82 and origin 72 are representative of field strengths of the electric field at locations where radiator 27R provides more energy than radiator 28R.

In a similar manner, a point 86 on pattern 70 has an abscissa representative of a negative error angle. Point 86 is representative of the strength of the electric field at locations where substantially all of the energy directed from the antenna system is provided by radiator 28R. Accordingly, when the target reflects energy to radiator 28R (and reflects substantially no energy to radiator 27R), a reference channel return signal having an amplitude corresponding to point 84 is provided at port 52. It should be understood that points on pattern 70 that have an abscissa between the abscissa of point 86 and origin 72 are representative of strengths of the electric field at locations where radiator 28R provides more energy than radiator 27R.

The antenna system radiates electric fields, corresponding to the field represented by pattern 70, in response to the application of excitation to each pair of adjacent ones of radiators 24R-31R. From the explanation given hereinbefore, power divider 54, magic TEEs 66-69, phase shifters 24P-31P and Butler matrix 46 are operable as a monopulse radar reference channel feed.

The difference port of magic TEEs 66-69 are connected to a power divider 88 at ports 90-93 thereof, respectively. An output terminal of power divider 88 is connected to a difference port 89 of control unit 32B. In response to a hypothetical signal being applied at port 89, a group of four divider signals are provided at ports 90-93. Power divider 88, similar to power dividers 34 and 54, is a linear, bilateral network whereby signals provided to ports 90-93 cause a corresponding signal to be provided to port 89. As explained hereinafter, power divider 88, magic TEEs 66-69, phase shifters 24P-31P and Butler matrix 46 are operable as a monopulse radar difference channel feed.

Figure 9:
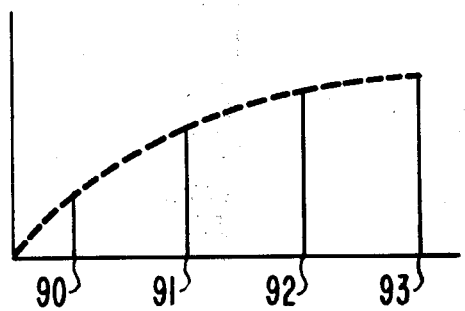
FIG. 9 is a graph of a transfer characteristic of a second power divider in the apparatus of FIG. 6.

As shown in FIG. 9, ports 90-93 are represented as evenly spaced points along an abscissa 94. In accordance with FIG. 9, the four divider signals have amplitudes representative of values of a sinusoid within an angular range of zero radians to $\pi/2$ radians. In response to the four divider signals, magic TEEs 66-69 provide difference channel signals to phase shifters 24P-31P.

Figure 10:
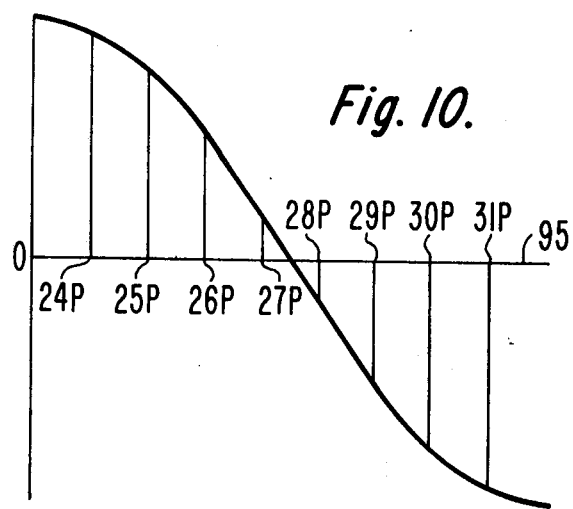
FIG. 10 is a graph of the amplitude of signals provided in a difference channel of the apparatus of FIG. 6.

As shown in FIG. 10, phase shifters 24P-31P are represented as evenly spaced points along an abscissa 95. According to FIG. 10, the difference channel signals are representative of values of a sinusoid within an angular range of $\pi/2$ radians to $-\pi/2$ radians. In response to the difference channel signals, excitation is applied to radiators 24R-31R in accordance with a second transform relationship which is given as:

$$a_m = \frac{\phi(m,n)\cos\phi(m,n)}{(\frac{\pi}{2})^2 - \phi(m,n)^2} \tag{4}$$

Figure 11:
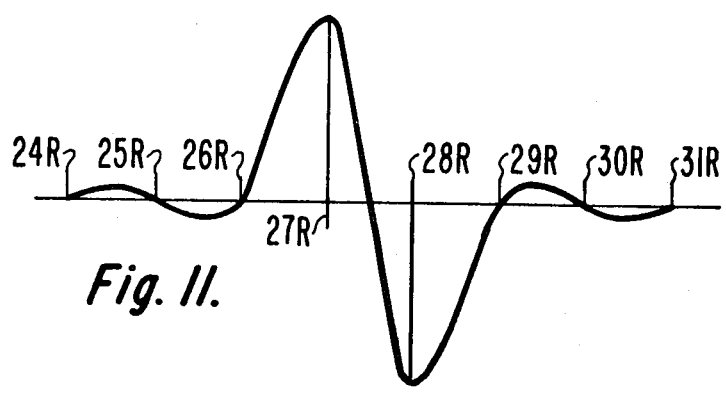
FIG. 11 is a graph of the amplitude of excitation applied to radiators of FIG. 1 in response to signals in accordance with FIG. 10 that are applied to the difference channel of the apparatus of FIG. 6.

As shown in FIG. 11, when phase shifters 24P-31P do not cause phase shifts of the difference channel signals, excitation of equal amplitude and opposite phase is applied to radiators 27R and 28R in accordance with the second transform relationship (4); no excitation is applied to radiators 24R, 25R, 26R, 29R, 30R and 31R because they correspond to nulls of the second transform relationship (4). The tabulation in Table 1 relates the phase patterns of FIGS. 5A-5F to the application of excitation to radiators 24R-31R in accordance with the second transform relationship (4).

As shown in FIG. 8, when excitation of equal amplitude and opposite phase is applied to radiators 27R and 28R, an electric field that radiates from the antenna system has a far field represented by a difference pattern 96. It should be appreciated that pattern 96 passes through origin 72. Since power divider 88 is a linear bilateral network, and pattern 96 passes through point 72, when the target reflects equal amounts of energy to radiators 27R and 28R, no signal is provided at port 89.

A point 98 of pattern 96 has an abscissa which is the same as the abscissa of point 82 referred hereinbefore. Accordingly, when the target reflects energy to radiator 27R (and reflects no energy to radiator 28R) an error signal having an amplitude corresponding to a point 100 on ordinate 81 is provided at terminal 89. Analogous to pattern 70, points on pattern 96 that have an abscissa between the abscissa of point 98 and origin 72 are representative of error signals that are provided in response to a target signal reflecting more energy to radiator 27R than to radiator 28R.

In a similar manner, a point 102 on pattern 96 has an abscissa which is the same as the abscissa of point 86.

What is claimed is:

1. Apparatus adapted for providing excitation to two or more radiators of a beam forming antenna system of a radar, comprising:
    power divider means having an attenuation function varying according to the value of a sinusoid whose argument varies from zero radians to $\pi$ radians adapted for receiving a signal from said radar;
    a plurality of phase shifters coupled to said power divider means having a linear phase shift between adjacent phase shifters;
    a Butler matrix coupled to said phase shifters adapted to provide an inverse transform relationship between said phase shifters and said radiators in response to a transmitted signal provided at a reference channel port;
    reference channel means for providing at divider reference channel ports thereof signals having amplitudes representative of values of a sinusoid within an angular range of $\pi/2$ radians to $\pi$ radians in response to said transmitted signal and for providing a reference channel signal to said reference port in response to an application of signals to said divider reference ports;

difference channel means for providing at divider difference channel ports thereof signals having amplitudes representative of values of a sinusoid within an angular range of 0 radians to $\pi/2$ radians in response to an application of a hypothetical signal applied at a difference channel port of said radar, and for providing a difference channel signal to said difference port of said radar in response to an application of signals to said divider difference ports;

said plurality of phase shifters connected to said Butler matrix and adapted for connection to a computer that provides a signal representation of a phase shift pattern, said phase shifters providing output signals substantially equal in amplitude to input signals applied thereto with a phase difference therebetween in accordance with said phase pattern; and means for coupling said reference channel means and said difference channel means to said phase shifters.

2. The apparatus of claim 1 wherein said reference channel means comprises a linear, bilateral power divider.

3. The apparatus of claim 1 wherein said difference channel means comprises a linear, bilateral power divider.

4. The apparatus of claim 1 wherein said means for coupling comprises a plurality of magic TEE networks having sum ports and difference ports respectively connected to said reference channel means and said difference channel means, signal ports of said magic TEEs being connected to said phase shifters.

5. Apparatus adapted for providing excitation to two or more radiators of a beam forming antenna system of a radar, comprising:

power divider means having an attenuation function varying according to the value of a sinusoid whose argument varies from zero radians to $\pi$ radians adapted for receiving a signal from said radar;

a plurality of phase shifters coupled to said power divider means having a linear phase shift between adjacent phase shifters;

a Butler matrix coupled to said phase shifters adapted to provide an inverse transform relationship between said phase shifters and said radiators;

whereby high sidelobes of said beam and width spreading of said beam are respectively reduced;

a paraboloid reflector; and a platform that has a surface which carries said radiators and said reflector, said radiators being disposed along a line that intersects the focal point of said reflector at an angle with the axis thereof that causes said reflector to provide a beam of electromagnetic energy that is focused along a line transverse to a central axis of said beam when electromagnetic energy is transmitted to said reflector from one of said radiators.

6. The apparatus of claim 5 wherein said platform is rotatable about an azimuth axis when said surface is substantially parallel to the ground, said line is in an elevation sector and said angle is in accordance with a relationship which is given as:

$$\phi = \arctan 4f/(y_1 + y_2)$$

where
$\phi$ is said angle;
f is the focal length of said reflector;
$y_1$ is a distance of said axis from a top edge of said reflector; and
$y_2$ is a distance of said axis from a bottom edge of said reflector.

7. The apparatus of claim 5 wherein said plurality of phase shifters are coupled to a computer by which the linear phase shift across said plurality of phase shifters is suitably adjusted.

* * * * *